UNITED STATES PATENT OFFICE.

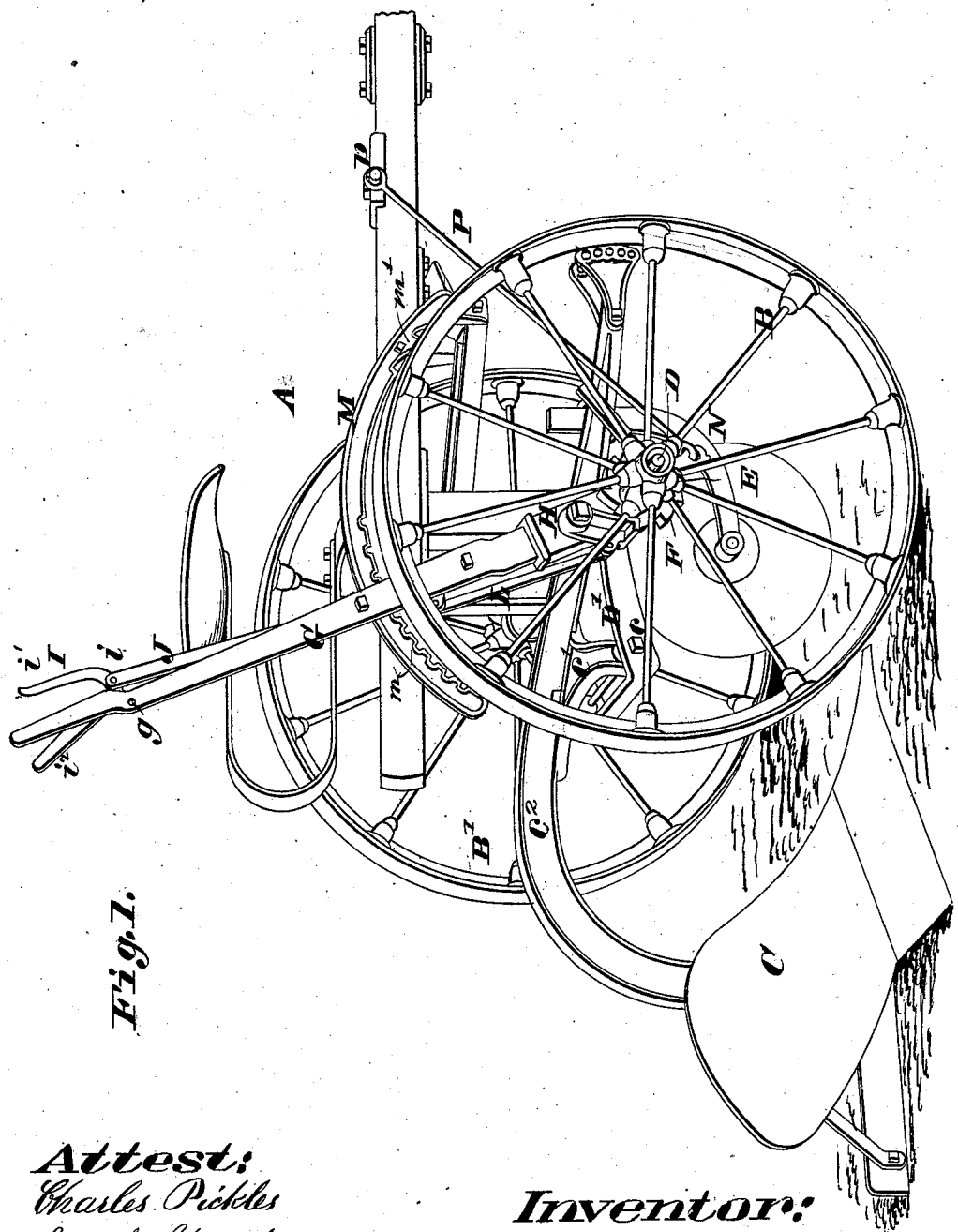

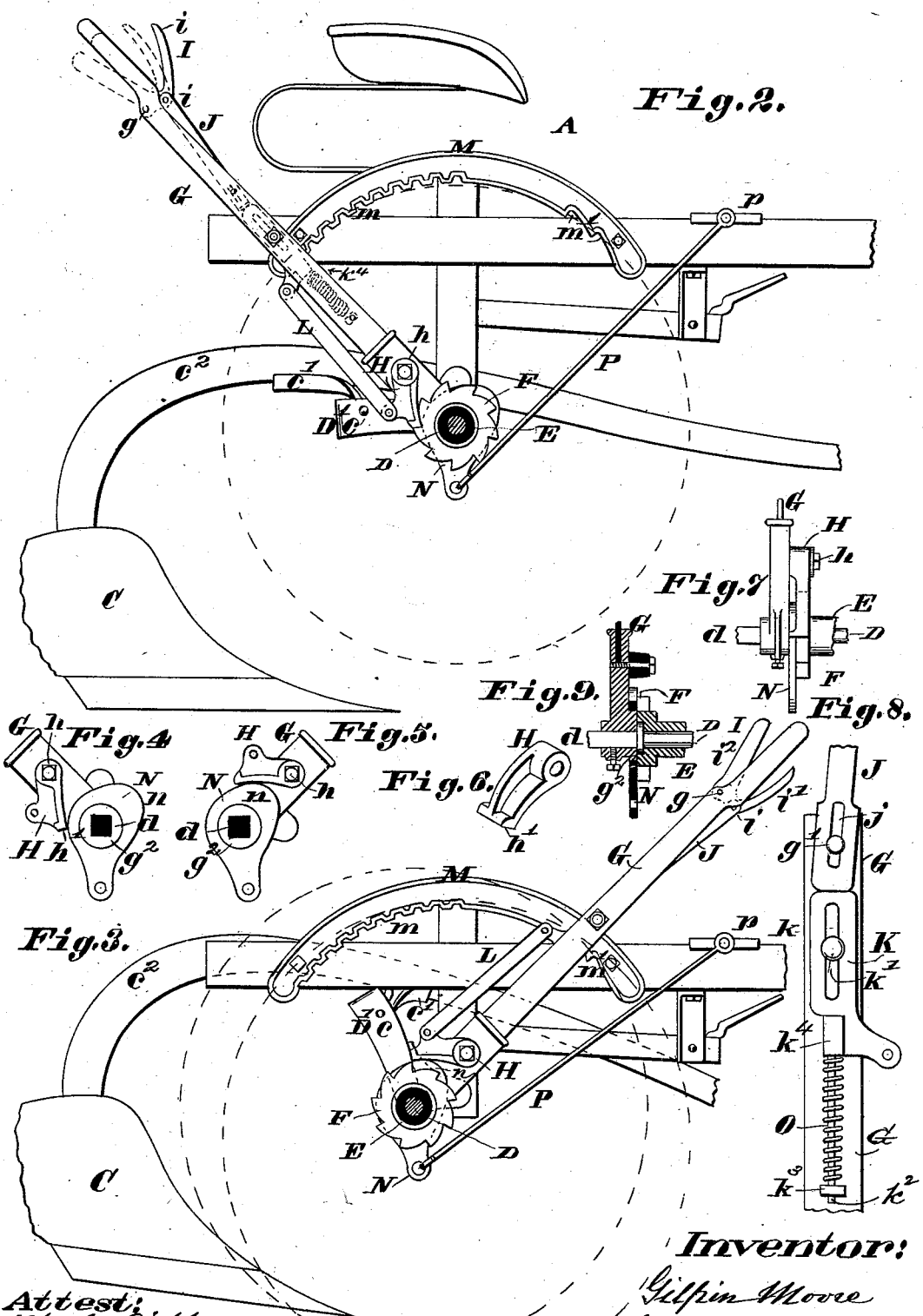

GILPIN MOORE, OF MOLINE, ILLINOIS, ASSIGNOR TO DEERE AND COMPANY, OF SAME PLACE.

SULKY-PLOW.

SPECIFICATION forming part of Letters Patent No. 255,391, dated March 21, 1882.

Application filed November 4, 1881. (No model.)

*To all whom it may concern:*

Be it known that I, GILPIN MOORE, of Moline, Illinois, have made a new and useful Improvement in Sulky-Plows, of which the following is a full, clear, and exact description, reference being had to the annexed drawings, making part of this specification, in which—

Figure 1 is a view in perspective of a sulky-plow having the improvement; Fig. 2, a side elevation of the implement, the carriage-wheel toward the observer being removed, the axle and hub being in section, and the parts being as when the plow is down upon the ground; Fig. 3, a similar side elevation, the parts being as when the plow is lifted; Figs. 4 and 5, sectional views taken on the line $x\ x$ of Fig. 9, and showing the lower end of the lifting-lever, the pawl thereon, and the cam upon which the pawl rides, the lever and pawl being shown in different positions in the two figures; Fig. 6, a perspective view of the pawl; Fig. 7, a detail, being an edge elevation of the ratchet and cam and other parts immediately therewith connected; Fig. 8, a view from the opposite side to that shown in Figs. 4, 5, showing the middle portion of the lifting-lever and the mechanism immediately thereto attached; and Fig. 9, a sectional view of the parts shown in Fig. 7.

The same letters denote the same parts.

This invention relates to that class of plows wherein by the locking of the wheels the plow may be raised by the team; and the novelty consists in the construction and combination of several parts, all as will now be set out and explained.

Referring to the drawings, A represents a sulky-plow of the usual construction, saving as modified by the present improvement, having the wheels B B' and the plow C.

D represents the carriage-axle. Between the wheels B and B' it assumes the crank or U shape shown at D', and which at $c$ is pivoted to the arms $c'\ c'$ of the plow-beam $c^2$. By turning the axle D in its bearings in the wheels B B' the part D' is turned from a horizontal position upward and forward, and the plow thereby lifted from the ground. This is accomplished by means of what is styled a "power-lift," as follows: The hub E of the wheel B is provided with a ratchet, F, which turns with the hub upon the axle D. A lever, G, is rigidly attached at its lower end to the axle D, the latter for that purpose being squared at $d$, where the lever is attached.

H represents a pawl pivoted to the lever at $h$, and arranged to engage in the ratchet F. When thus engaged the wheel B and axle D become interlocked, and the rotation of the wheel therefore causes the plow to be lifted, changing the position of the various parts from the position of Fig. 2 to that of Fig. 3.

To operate the pawl H the following mechanism is employed: A lever, I, is pivoted to the lever G at $g$. A rod, J, jointed at its outer end to the lever I at $i$, is arranged to be moved longitudinally upon the lever G, being slotted at $j$ to engage with a stud, $g'$, upon the lever G. The rod J bears endwise against a part, K, which also is arranged to slide longitudinally upon the lever G, its upper end being slotted at $k$ to engage with a stud, $k'$, upon the lever, and its lower end, $k^2$, moving in a perforated ear, $k^3$, upon the lever. The part K is also furnished with a tooth, $k^4$, which projects laterally. A rod, L, connects the part K and the pawl H. By turning the lever I on its pivot $g$, so as to move the rod J downward upon the lever G, the pawl H is thrown into engagement with the ratchet F, as seen in Fig. 2. The same movement also releases the tooth $k^4$ from the notches $m$ of the segment M. The lever G is then free to move and swing forward into the position of Fig. 3. By the time, however, the lever reaches the last-named position the pawl H will have become disengaged from the ratchet F, and as follows: A cam, N, is supported alongside the ratchet F, and the point $h'$ of the pawl H is sufficiently wide to bear upon both the cam and the ratchet. The cam is shaped and arranged so that the projection $n$ thereof comes opposite and projects out beyond that portion of the ratchet that the point of the pawl is over when the lever is thrown forward to the forward end of the segment. This causes the pawl to be lifted out of the ratchet, leaving the latter and the wheel B free to continue to rotate. The cam is conveniently supported in place by hanging it loosely upon a boss, $g^2$, upon the side of the lever G.

A spring, O, acts to move the part K outward upon the lever G and cause the tooth $k^4$ to enter the notches $m'$ of the segment M as soon as the lever G is thrown sufficiently forward. To release the lever G from the segment, the lever I is moved to thrust the part K sufficiently downward to disengage the tooth $k^4$ from the notches in the segment, but not enough to bring the pawl against the cam. The lever G then moves backward and the plow drops down again upon the ground, as in Fig. 2. On releasing the lever I the spring O acts to throw the tooth $k^4$ into the notches $m$ again, thereby locking the lever in that position.

The rod P, fastened at one end, $p$, to some suitable fixture of the machine and at the other end to the cam N, serves to hold the latter from turning on its bearing out of its proper position.

The two positions of the lever G and pawl H relatively to the cam N are shown in Figs. 4 and 5, respectively.

The lever I preferably has two handles, $i'$ and $i^2$, to facilitate its operation.

The dotted circles in Figs. 2 and 3 indicate the positions of the carriage-wheels.

I claim—

1. The combination of the wheels B B', the axle D D', the plow-beam $c^2$, and ratchet F with the lever G, pawl H, lever I, rod J, part K, rod L, and spring O, substantially as set forth.

2. The combination of the wheels B B', axle D D', and ratchet F with the lever G, the part K, tooth $k^4$, the segment M, and spring O, substantially as set forth.

3. In a wheel-plow, as described, the combination of the axle D D', levers G and I, and rod J with part K, tooth $k^4$, rod L, spring O, and segment M, substantially as described.

4. The combination of the axle D, the lever G, having the boss $g^2$, the cam N, and the pawl H, substantially as described.

5. The combination of the axle D, the lever G, the wheel B, the ratchet F, the pawl H, the cam N, the segment M, the part K, and tooth $k^4$, substantially as described.

6. The combination of the axle D, the wheel B, the ratchet F, the lever, G the boss $g^2$, the cam N, and means for keeping the cam from turning on the boss.

7. The combination of the loose cam N and the rod P, substantially as and for the purpose described.

GILPIN MOORE.

Witnesses:
W. J. ENTRIKIN,
J. T. BROWNING.